T. B. SLATE.
CRANK SHAFT.
APPLICATION FILED MAR. 18, 1916. RENEWED NOV. 24, 1916.
1,210,996.
Patented Jan. 2, 1917.
2 SHEETS—SHEET 1.
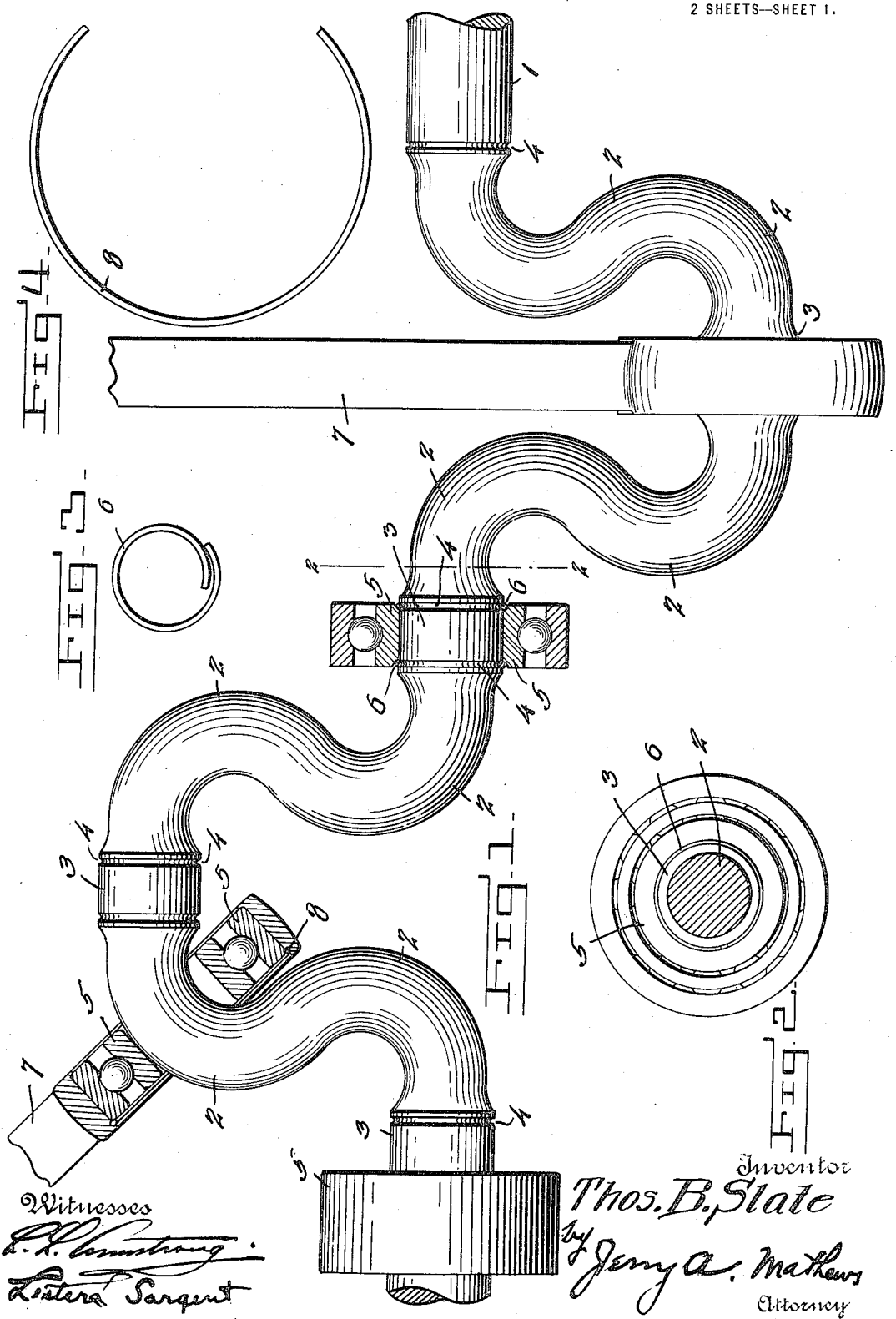
Witnesses
Inventor
Thos. B. Slate
by Jerry A. Mathews
Attorney

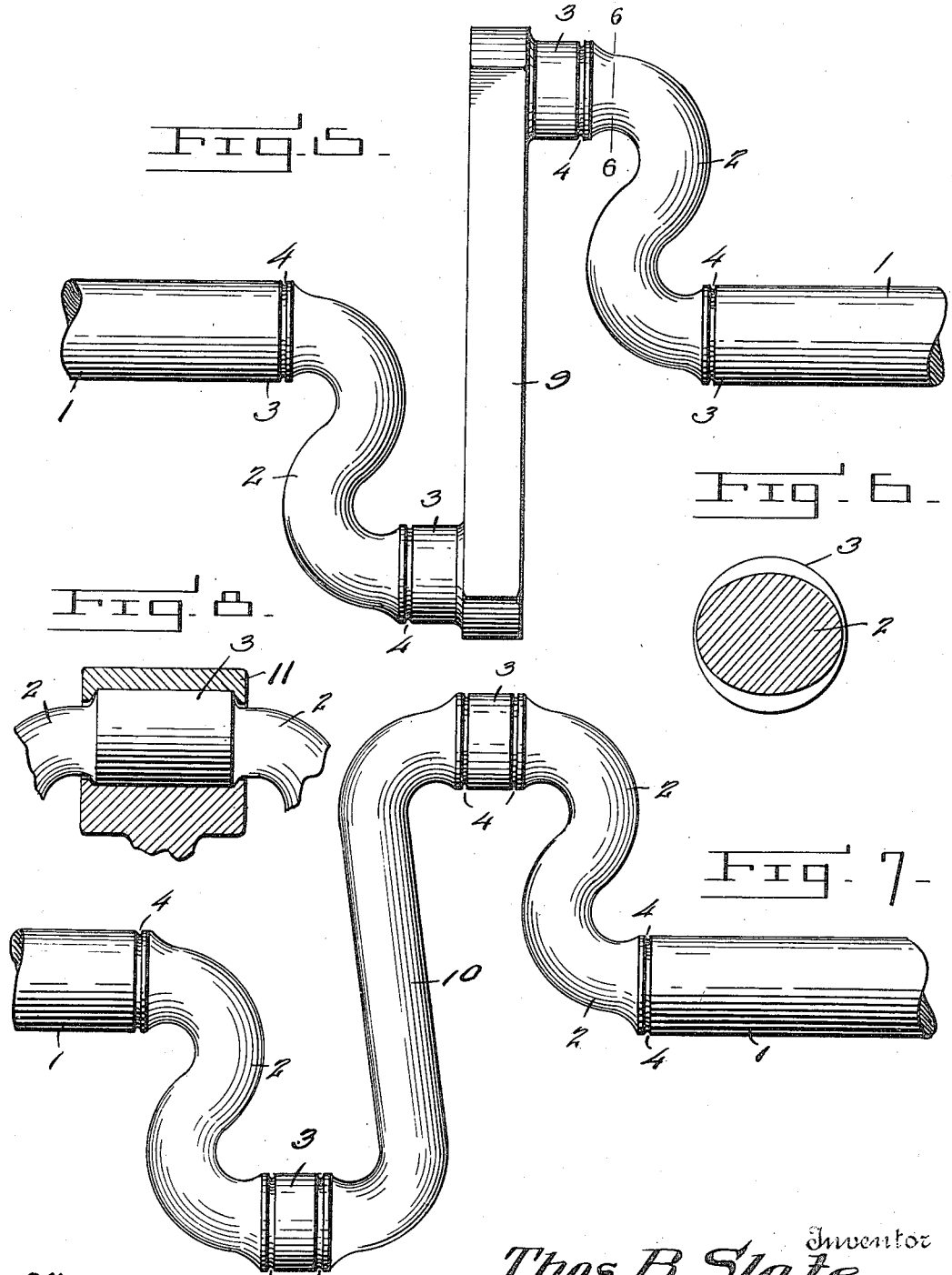

UNITED STATES PATENT OFFICE.

THOMAS B. SLATE, OF WASHINGTON, DISTRICT OF COLUMBIA, ASSIGNOR TO AMERICAN MECHANICAL IMPROVEMENT COMPANY, OF WASHINGTON, DISTRICT OF COLUMBIA, A CORPORATION OF WEST VIRGINIA.

CRANK-SHAFT.

1,210,996.　　　Specification of Letters Patent.　　　Patented Jan. 2, 1917.

Application filed March 18, 1916, Serial No. 85,138. Renewed November 24, 1916. Serial No. 133,268.

*To all whom it may concern:*

Be it known that I, THOMAS B. SLATE, a citizen of the United States, residing at Washington, in the District of Columbia, have invented a new and useful Crank-Shaft, of which the following is a specification.

My invention relates to a novel type of crank shaft adapted for use in all kinds of engines, air compressors, piston pumps, and wherever power is received for transmission from or to a piston or connecting rod or other like means.

It is the object of my invention to provide a crank shaft that is resilient to the extent that if its bearings are not in perfect alinement or if they should be thrown out of alinement by any cause while in operation it will not throw any undue stress or strain on the bearings, and that will have sufficient resiliency to take care of any reasonable amount of torsion from the above causes without crystallizing or breaking the shaft and without causing excess friction.

It is a further object to provide a crank shaft that will be lighter in weight compared to its strength than the ordinary type of crank shaft, and to provide a form of crank shaft that can be bent into shape very easily and economically, leaving the grain of the metal longitudinally with the shaft through all its various curves and parts, resulting in a decided increase in strength and a reduction in cost of material and manufacture.

It is also my object to provide a crank shaft on which ball or roller bearings may be used of the solid or single unit type and which may be easily passed around over the shaft to their proper positions, making a self-adjusting bearing readily and easily removed, replaced and interchangeable.

It is my special object to provide a crank shaft for use in internal combustion engines that will be to a certain extent resilient to the sudden shock or concussion caused by the explosion of the gases in the engine cylinder and that will conform to any result in change of alinement of main or crank case bearings caused by expansion from heat of engine cylinders and their adjacent side of crank case or from any other cause.

It is also my object to provide a crank shaft for the use of self-adjusting bearings, that will be free from bolts, nuts or any other adjusting apparatus liable to work loose and cause trouble.

It is my object to provide a crank shaft not limited to the use of ball or roller bearings but adapted for use with friction bearings as well.

It is further my object to provide a crank shaft having enlarged bearings and having the webs or crank arms of reduced size and bent to a novel approximately S-shape of even and equal curvature from one bearing to the other, to provide a cushion-like or springy effect to take care of all torsion the shaft may be subjected to and to provide the greatest possible length of shaft of even and equal strength for the purposes mentioned above.

It is also my object to provide a novel crank shaft of the type set forth for common or friction type of bearings, the bearings being made in halves and bolted together, the bearings of the crank shaft being enlarged and of additional length necessary to give the required wearing surface.

It is further my object to provide a crank shaft of the type set forth adapted for the use of opposed engines, while retaining the advantages of resilient web members of reduced size relative to the bearings; and to provide types of shafts suitable for engines differently positioned as regards proximity of the pistons to each other.

I attain the objects of my invention by the mechanism illustrated in the accompanying drawings, in which—

Figure 1 is a side view of the crank shaft with one of the ball bearing members removed from the bearing seat; Fig. 2 is a section on line 2—2 of Fig. 1; Fig. 3 is a detail of member 6; Fig. 4 is a detail of member 8; Fig. 5 is a side view of the crank shaft as constructed for use with engines of the opposed type where the bearings lie in planes in close proximity; Fig. 6 is a section on line 6—6 of Fig. 5; Fig. 7 is a side view of the crank shaft as constructed for use with engines of the opposed type where the bearings lie in planes more distant than shown in Fig. 5; and Fig. 8 is a detail of a friction bearing member adapted for use with my crank shaft with whatever type of engine it may be used.

Similar numerals refer to similar parts throughout the several views.

Referring to the accompanying drawings, 1 denotes the crank shaft as a whole, comprising novel crank webs 2 of approximately S-form as shown, connecting bearing seats 3 of relatively larger size than members 2 for ball or roller bearings. I prefer to provide suitable small grooves 4 in bearing seats 3, to receive a suitable spring keeper 6 to hold bearings in place.

Referring to Figs. 1 and 2, 5 denotes suitable bearings such as are now in common use; 8 designates an expansive spring keeper of suitable design to hold bearings in connecting rod 7.

Referring to Fig. 5 this illustration shows a cross web 9 for a drop forged crank shaft especially adapted to what is commonly known as the opposed type of engines the arrangement being adapted for use in instances where it is desirable to locate the connecting rods in longitudinal planes in as close proximity to each other as possible.

Referring to Fig. 7 this also illustrates a construction of the crank shaft adapted for use with engines of the opposed type, having a cross web 10 of resilient type and of the same circumferential dimension as the web 2.

Referring to Fig. 8, 11 designates a friction bearing of suitable form to fit the enlarged bearing surface 3, member 11 being cupped at the ends to hold the bearing in position, as illustrated.

I may provide webs 2 and 10 of elliptical form in cross section, as illustrated in Fig. 6 to give increased strength for use with engines of heavy type, where the shaft is to be made up by the drop-forging process.

It is to be understood that the modification of the crank bearing shown in Fig. 8 is not an essential feature and is only to be used where the old style of friction bearings are preferred.

The bearing seats 3 are of relatively larger diameter than the webs 2, thus permitting the bearings 5 to be passed around over the crank shaft from one position to another, as illustrated in Fig. 1, to permit of ready removal and replacing of bearings.

I prefer to provide springs 6 to hold the bearings in position on the bearing seats, thus eliminating entirely the use of bolts, nuts, lockwashers or cotter pins and lessening the danger of bearings or bearing adjustments working loose and causing trouble.

It is to be understood that the S-shape of crank webs 2 is not to be of any fixed degree of S-shape and will vary according to the amount of throw of the crank shaft, a crank shaft with short throw requiring a less degree of S-shape to allow for the passing of bearings over crank web 2 from one bearing seat to another.

In operation, the S-shaped crank webs 2 have a degree of resiliency that permits them to absorb the shock communicated from the piston through the connecting rod to the bearings 3, and the curvature of the webs effects an equal distribution of the spring and contortion of shaft from one bearing to the other, thereby preventing the crystallization and breaking of crank shaft which is liable to occur in crank shafts of the ordinary type. The peculiar shape of the crank web 2 affords the greatest practicable length of web between bearings and provides a uniform curvature. The shaft is largest and strongest in the bearings where there is most liability of crystallization and breakage in the usual form of crank shaft.

It is to be understood that the crank shaft can be made up in any desired number of cranks or throws; and set in any angle, one to the other, desired by the maker; and that the method of holding the bearings in position by the use of spring keepers, fitting in a groove turned in the shaft as shown, while an improvement, is not essential and is shown only to illustrate an improved means for holding the bearings in position.

While I have described the invention as being particularly for use in gasolene engines, I do not wish to be understood as being restricted to the embodiment of the invention in a gasolene engine or to any other particular class of machinery but to be used in all cases where a ball or roller-bearing crank shaft would be advantageous.

What I claim is:

1. A crank shaft having a plurality of reduced resilient portions of approximate S-shape forming the crank webs and having bearing portions of larger size in cross section than the crank webs, substantially as and for the purposes described.

2. A crank shaft having a plurality of S-shaped resilient crank webs, relatively larger bearing portions positioned for operative connection with engines of the opposed type, and a member immediately connecting said bearings.

3. A crank shaft having a plurality of S-shaped webs of reduced size nonangular in cross section and having a degree of resiliency, enlarged bearing portions, grooved portions in said bearing portions, bearings removably mounted on said enlarged bearing portions, and resilient bearing retaining rings removably clasped in the grooved portions, for the purposes set forth.

THOMAS B. SLATE.

Witnesses:
CHAS. E. BRICKONS,
THOMAS S. LEE.